United States Patent [19]

Fox

[11] Patent Number: 4,933,623

[45] Date of Patent: Jun. 12, 1990

[54] GENERATOR VOLTAGE REGULATOR POWER CIRCUIT

[75] Inventor: David A. Fox, Shawnee Township, Allen County, Ohio

[73] Assignee: Westinghouse Electric Corp., Pittsburgh, Pa.

[21] Appl. No.: 290,387

[22] Filed: Dec. 29, 1988

[51] Int. Cl.[5] ............................................. H02P 9/30
[52] U.S. Cl. ..................................... 322/25; 322/27; 363/16
[58] Field of Search ...:.................... 322/22, 25, 27, 28, 322/59, 73, 99; 363/16, 17, 98, 132

[56] References Cited

U.S. PATENT DOCUMENTS

| 4,032,835 | 6/1977 | Finnell et al. | 322/25 X |
| 4,044,296 | 8/1977 | Dhyanchand et al. | 322/25 |
| 4,264,856 | 4/1981 | Frierdich et al. | 322/27 X |
| 4,346,337 | 8/1982 | Watrous | 322/25 |
| 4,446,417 | 5/1984 | Fox et al. | 322/25 |
| 4,585,986 | 4/1986 | Dyer | 363/17 X |

FOREIGN PATENT DOCUMENTS

| 0029522 | 3/1978 | Japan | 363/16 |
| 0136075 | 8/1984 | Japan | 363/16 |

Primary Examiner—Patrick R. Salce
Assistant Examiner—Kristine Peckman
Attorney, Agent, or Firm—R. P. Lenart

[57] ABSTRACT

A generator voltage regulator circuit is provided with a switching circuit for alternatively connecting or disconnecting a generator exciter field winding to a DC power source. A discharge circuit is provided for conducting current, produced by a collapsing magnetic field in the exciter winding following disconnection of the winding by the switching circuit, in a revese direction through the DC power source. A driving circuit controls the switching circuit with a series of turn-on pulses. Each of the turn-on pulses is initiated in response to a transition in a clock signal and is terminated alternatively when the current in the exciter field winding reaches a predetermined magnitude or when a second transition occurs in the clock signal. This invention also encompasses a method of regulating exciter field current performed by this circuit.

6 Claims, 4 Drawing Sheets

GENERATOR VOLTAGE REGULATOR POWER CIRCUIT

BACKGROUND OF THE INVENTION

This invention relates to voltage regulation in electric generators and, more particularly, to a power circuit for use in voltage regulators and the method of controlling generator voltage performed by that circuit.

Controlling the output voltage of an electric generator requires control of the generator excitation or exciter field current. Because of the power levels required in some applications, switching regulators are typically used. A typical voltage regulator for aircraft generators is illustrated in U.S. Pat. No. 4,446,417 issued May 1, 1984. In the regulator disclosed in that patent, during normal operation, a positive DC voltage is applied to one end of the generator exciter field winding, and the other end of the winding is connected to ground or, alternatively, to the positive DC voltage by means of a switching transistor. The pulse width modulated duty cycle of the switching transistor controls the average voltage across the exciter field and thus the exciter field current. That current is sensed and converted to a current source signal for feedback to a stability circuit.

If a rapid decrease in exciter field current is desired, such as due to a load decrease, the normal current decay (proportional to the inductance/resistance time constant) is not sufficient. Negative field forcing is used to provide a large negative voltage across the field winding, thereby forcing the current down rapidly. In the circuit of the cited patent, the negative field forcing function is nonlinear. Control of the negative field forcing circuit is provided by an independent control loop which responds to large errors in the output current. Under certain transient conditions, the normal regulation pulse width modulated signal and the negative field forcing circuits can compete for control of the generator output. This situation can degrade transient response.

The present invention provides a generator voltage regulator power stage in which negative field forcing is accomplished without competing with the control circuit used for normal regulation of the generator output.

SUMMARY OF THE INVENTION

Generator voltage regulator power circuits constructed in accordance with this invention include a switching circuit for alternatively connecting or disconnecting a generator exciter field winding to a DC power source, and a discharge circuit for conducting current, produced by a collapsing magnetic field in the exciter field winding following disconnection of the winding by the switching circuit, in a reverse direction through the DC power source. A drive circuit provides a switching circuit with a series of turn-on pulses. Each of the turn-on pulses is initiated in response to a transition in a clock signal and is terminated alternatively when the current in the exciter field winding reaches a predetermined magnitude, or when a second transition occurs in the clock signal.

In the preferred embodiment, the switching circuit includes a pair of solid state switching devices electrically connected in series with the generator exciter field winding, and the discharge circuit includes a pair of diodes also electrically connected in series with the field winding. The switches and diodes are connected in a halfbridge power stage which provides maximum field forcing when the switches are turned off.

This invention also encompasses the method of controlling generator voltage performed by the above power circuit and the preferred embodiment thereof. Regulator power circuits of this invention respond to a linear control signal and provide maximum field forcing to improve transient response. They are also fault-tolerant and can provide inherent exciter field current-limiting.

BRIEF DESCRIPTION OF THE DRAWINGS

The invention may be more fully understood by reference to the accompanying drawings which illustrate the preferred embodiment, by way of example only, in which.

DESCRIPTION OF THE PREFERRED EMBODIMENT

Figure 1:
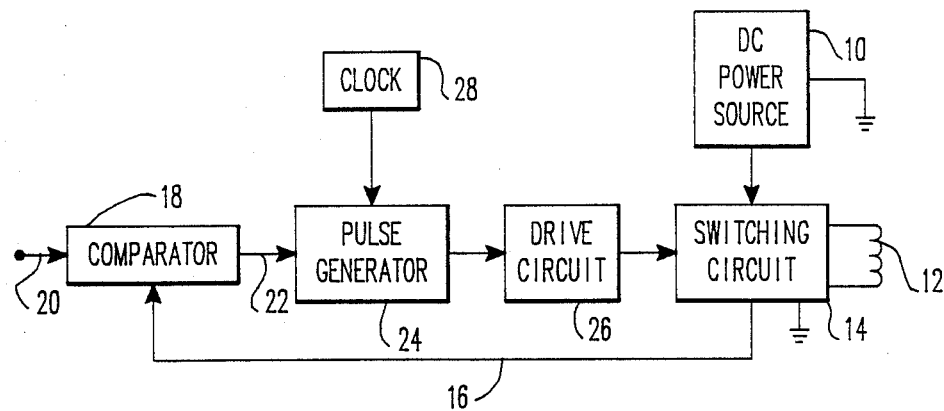
FIG. 1 is a block diagram of a generator voltage regulator power circuit constructed in accordance with one embodiment of the present invention.

Referring to the drawings, FIG. 1 is a block diagram of a generator voltage regulator power circuit constructed in accordance with one embodiment of this invention. A DC power source 10 provides the electric power required by a generator main exciter field winding 12. In a typical generator the DC power source may include a permanent magnet generator coupled to be driven along with the shaft of the main generator, and appropriate rectifying and filtering components as are found in prior art designs. A switching circuit 14 connects the main exciter field winding to the DC power source and operates to alternately produce forward and reverse polarity voltage across the winding. Current in the main exciter field winding is monitored, and a signal which varies in proportion to that current is fed back along line 16 to a comparator 18. A linear current demand signal is supplied to terminal 20, and the comparator compares this current demand signal with the current-indicating signal on line 16 to produce a control signal on line 22. A pulse generator 24 produces a series of turn-on pulses which are utilized by a drive circuit 26 to control the operation of the switching circuit 14. The pulse generator uses a clock input signal from clock circuit 28 to control pulse initiation, and uses the control signal on line 22 to control the termination each pulse.

Figure 2A:
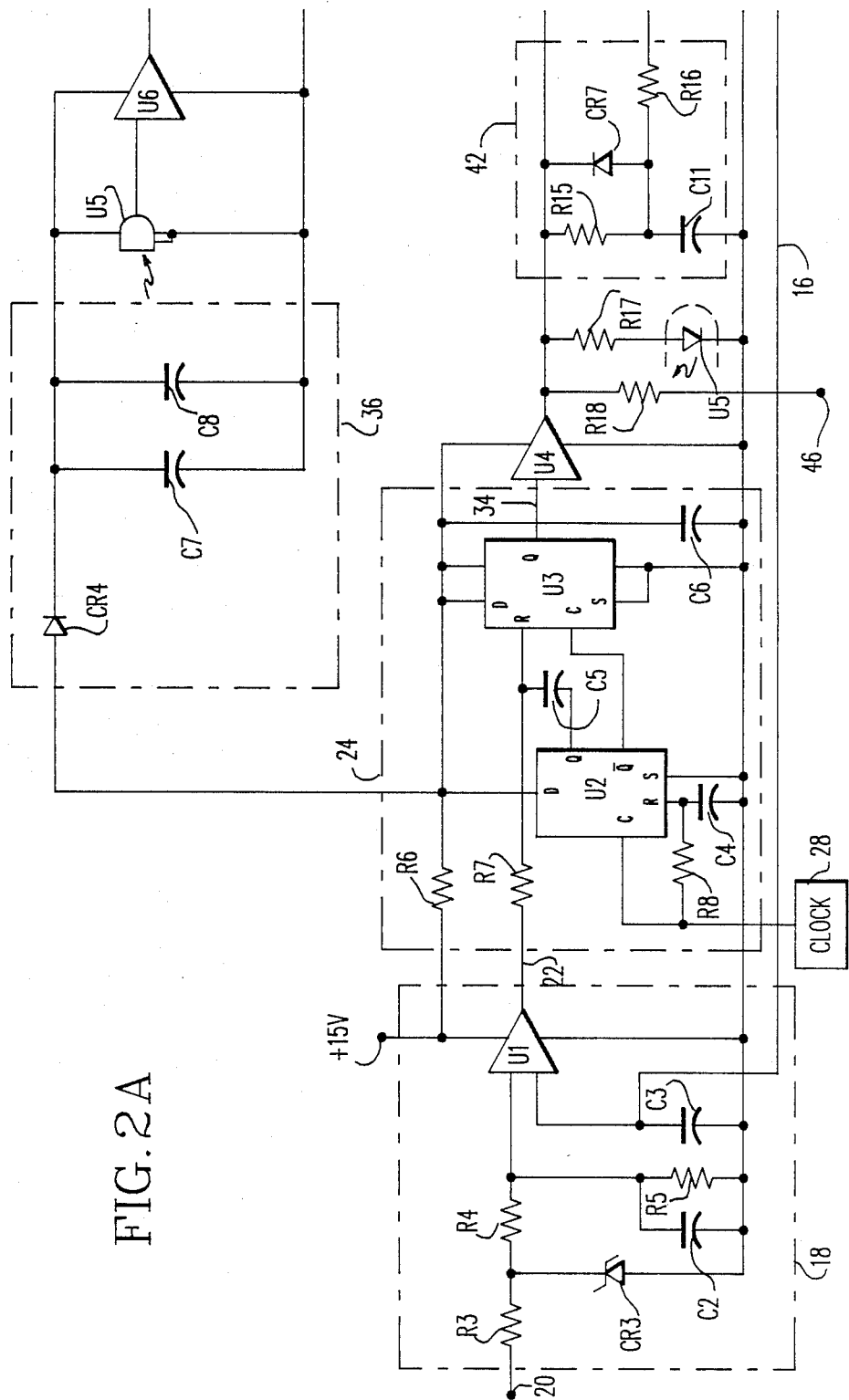
FIGS. 2A and 2B are a schematic diagram of the voltage regulator power circuit of FIG. 1.
Figure 2B:
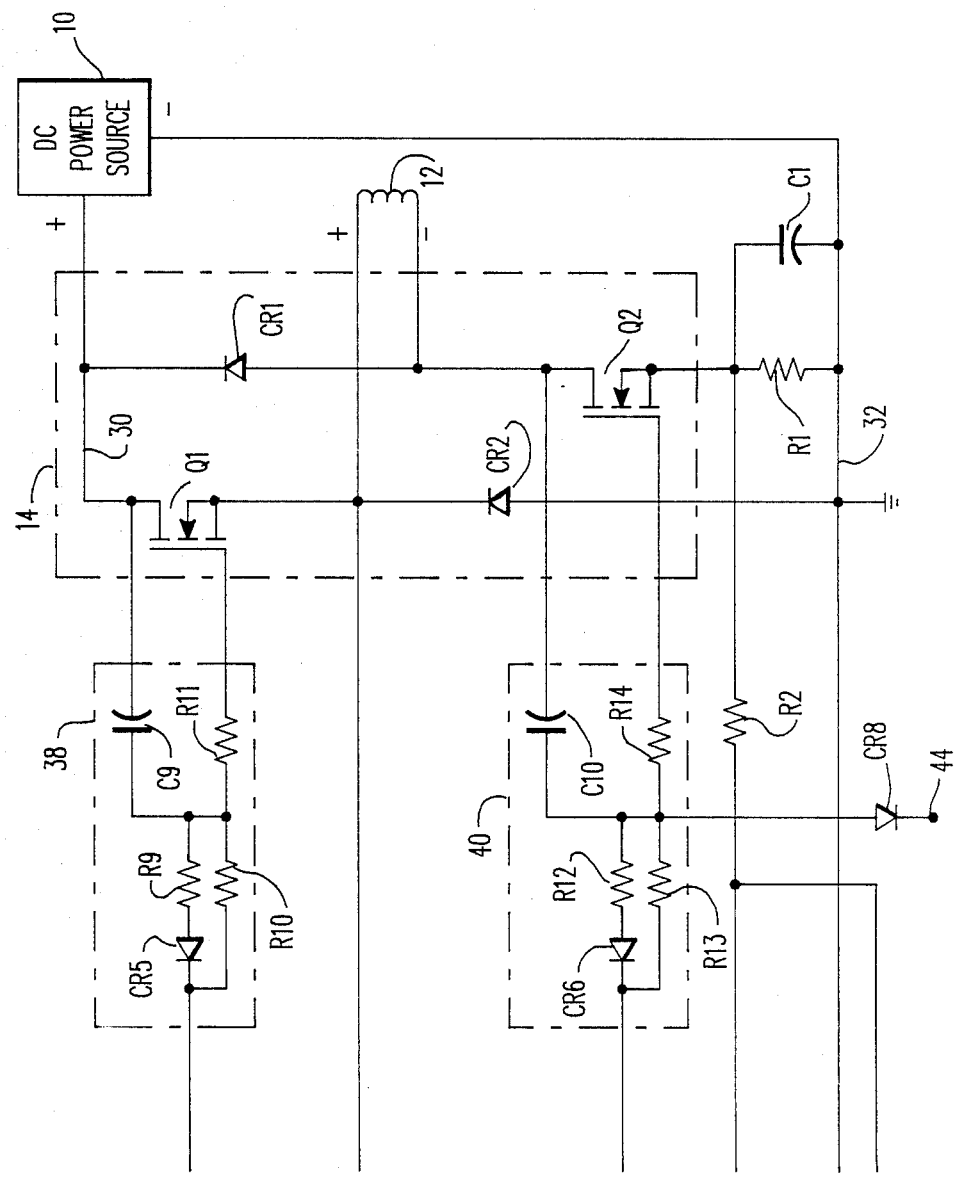

FIGS. 2A and 2B are a schematic diagram of the generator voltage regulator power circuit of FIG. 1. The switching circuit 14 is shown to include a pair of solid state switching devices in the form of transistors Q1 and Q2, and a pair of diodes CR1 and CR2. Transistor Q1 is electrically connected between one end of the exciter field winding 12 and a first DC power source conductor 30. Transistor Q2 is shown to be electrically connected between a second end of the exciter field winding and a second DC power source conductor 32. Diode CR1 is connected between the second end of the exciter field winding and the first DC power source conductor, and diode CR2 is connected between the first end of the field winding and the second power conductor. In this half-bridge switching circuit, the transistors serve as switching means for alternatively connecting or disconnecting the exciter field winding to the DC power source, and the diodes serve as discharge means for conducting current produced by a collapsing magnetic field in the exciter winding following disconnection of the winding from the power source, in a reverse direction through the DC power source. In operation the transistors are turned on simultaneously, and the duty cycle of the transistors is varied to control the voltage across the exciter field winding, thereby controlling the exciter field winding current.

Figure 3:
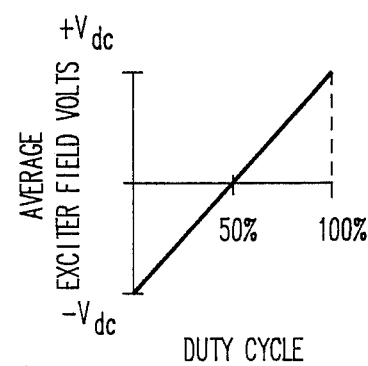
FIG. 3 illustrates the transfer function of the output stage of the circuit of FIGS. 2A and 2B.

Returning to FIGS. 2A and 2B, when transistors Q1 and Q2 turn on substantially simultaneously, the full DC output voltage $V_{DC}$ of the power supply is applied across the field winding. When transistors Q1 and Q2 turn off together, field current commutates through diodes CR1 and CR2 back to the power supply, applying full negative voltage $-V_{DC}$ to the field winding. The resulting exciter field voltage waveform switches between $+V_{DC}$ and $-V_{DC}$, with its average value being dependent upon the duty cycle as shown by the transfer function of FIG. 3. Note that the negative voltage output, occurring below the 50% duty cycle, can only be sustained while current is flowing in the positive direction. Thus, the half-bridge output circuit produces bidirectional output voltage but only unidirectional output current. This feature does not limit the use of the output stage as a voltage regulator power stage.

A network comprising shunt resistor R1, resistor R2, and filter capacitor C1 provides means for producing a current-indicating signal, representative of the actual current flowing in the exciter field winding while Q2 is on.

This signal is fed via line 16, to comparator circuit 18 which compares it with a linear current demand signal supplied at terminal 20. The comparator circuit includes resistors R3, R4, and R5; capacitors C2 and C3; zener diodes CR3; and amplifier U1. These components are connected as shown and operate to produce a control signal on line 22 which changes from a logic low level to a logic high level when the current-indicating signal exceeds a predetermined magnitude established by the current demand signal at terminal 20.

The pulse generator circuit 24 which comprises resistors R6, R7, and R8; capacitors C4, C5, and C6; and type D flip-flop circuits U2 and U3, connected as shown in FIG. 2A, uses a clock signal from clock 28 and the control signal on line 22 to produce a series of pulses on line 34. These pulses are used to turn on driver U4 which turns on transistor Q2 directly and transistor Q1 through an optoisolator U5 and driver U6.

A bootstrap power circuit 36, comprising diode CR4 and capacitors C7 and C8, provides voltage for the output stage of optoisolator U5 and driver U6. A pair of electromagnetic interference control circuits 38 and 40 at the gates of transistors Q1 and Q2 provide control of the rate of change of voltage with respect to time at the output of the drive circuit to minimize electromagnetic interference. Circuit 38 comprises resistors R9, R10, and R11; capacitor C9 and diode CR5. Circuit 40 comprises resistors R12, R13, and R14; capacitor C10; and diode CR6. A ramp network 42 comprising resistors R15 and R16; capacitor C11; and diode CR7, adds a ramp to the current-indicating signal across shunt resistor R1. This provides the standard slope compensation required for current programmed circuits operating at duty cycles greater than 50%.

Diode CR8 is included to provide a means for turning off transistor Q2 in case of a failure in the control circuits by connecting terminal 44 to ground. Resistor R17 limits the current to the light-emitting diode of optoisolator U5. Resistor R18 provides a means for monitoring the average voltage at a duty cycle indicating terminal 46.

The operation of the circuit of FIGS. 2A and 2B can now be described with reference to the timing waveform diagrams of FIGS. 4 and 5. Switching of the power stage is controlled by means of current programming logic developed by type D flip-flops U2 and U3 in the pulse generating circuit. This circuit receives an external clock signal that can be a fixed frequency or can be synchronized to the switching pattern of an inverter when the present invention is used in a variable speed constant frequency system application, to reduce modulation. The clock frequency must be sufficiently high to keep the exciter field current ripple low. The ripple current in the exciter winding depends on the clock frequency, the power supply voltage (e.g. a rectified permanent magnet generator output), and the inductance of the field winding.

The circuit of FIGS. 2A and 2B responds to a linear current demand signal on terminal 20. Prior art regulator power stages, which typically required pulse width modulated input control signals, impose limitations on the sensing and error amplifying portions of the regulator. The linear responding power stage of this invention allows greater freedom in the design of the overall voltage regulator.

Figure 4:
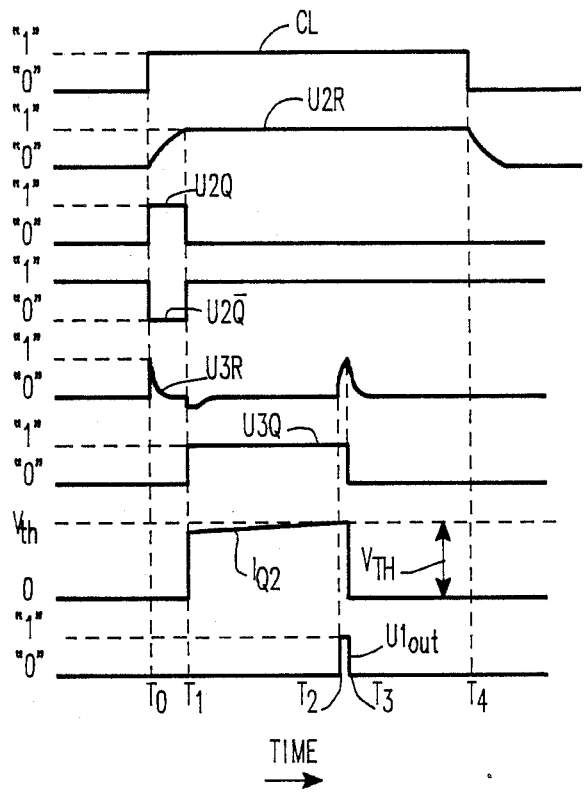
FIGS. 4 and 5 show a series of waveforms which illustrate the operation of the circuit of FIGS. 2A and 2B.
Figure 5:
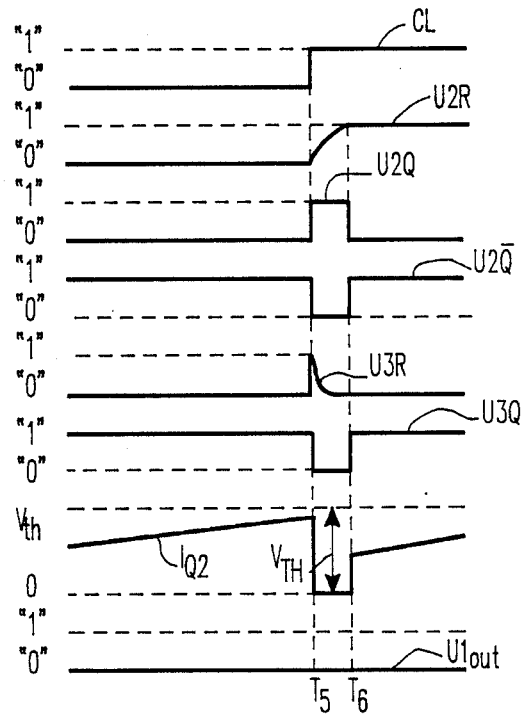

Referring to the timing waveforms of FIG. 4, a switching cycle starts at time $T_0$ when clock signal CL undergoes a transition from a logic low to a logic high level. This provides pulse signal U3R to the reset input of flip-flop U3, thereby resetting it if necessary. Resistor R8 and capacitor C4 control the rise time of the signal U2R at the reset terminal of flip-flop U2, such that flip-flop U2 resets at time $T_1$, which may be, for example, 7 $\mu$sec following time $T_0$. This resetting of flip-flop U1 causes the Q output U2Q to go high, clocking flip-flop U3 such that the Q output U3Q of flip-flop U3 goes high. This initial reset and time delay guarantees that the power stage turns off every cycle for a short time to keep the bootstrap power supply charged.

The output U3Q of flip-flop U3 turns on driver U4 which subsequently turns on transistors Q1 and Q2. The current sensed by resistor R1 results in a current signal $I_{Q2}$ which includes a ramp function supplied by network 42. When the current signal reaches a voltage threshold $V_{TH}$ established by the current demand signal on terminal 20, the output U1$_{out}$ of comparator circuit 18 goes high at time $T_2$. This resets flip-flop circuit U3 and terminates the pulse at time $T_3$. At time $T_4$ the clock signal returns to a logic low level.

If the current through the exciter field winding does not reach the programmed level, the control pulse produced by pulse generator circuit 24 is terminated at the beginning of the following clock pulse. This situation is illustrated in the timing waveforms of FIG. 5. At time $T_5$, the clock signal experiences a transition from a logic low to a logic high level. At this point, the current signal $I_{Q2}$ has not reached the voltage threshold level $V_{TH}$. Nevertheless, the transition of the clock signal resets flip-flop U3, thereby terminating the output pulse U3Q at time T$_5$. This pulse is again initiated after the predetermined time delay at time T$_6$.

At the control input of the comparator, Zener diode CR3 clamps the input to U1 at a predetermined maximum level. Since the circuit of FIGS. 2A and 2B has a linear response, this provides inherent current-limiting for the exciter field current. This feature reduces the risk of overheating the exciter of the generator due to excessive field current.

The response of the circuit of FIGS. 2A and 2B is essentially slew rate limited, with no inherent delay due to the inductance/resistance time constant of the field winding. The power stage programs the field current in response to the current demand signal, eliminating the exciter field time constant. The exciter field current feedback signal is not needed to stabilize the regulator. Compensation in the error amplifier used to produce the signal at terminal 20 is required only for the rotating field time constant.

The circuit of FIGS. 2A and 2B is also fault-tolerant. It will continue to operate with transistors Q1 or Q2 shorted. This condition only eliminates the field-forcing feature, causing degradation in load removal transient response. A failure in one of these transistors can be detected by monitoring the average voltage at the duty cycle output terminal 46. Normal operation is with a duty cycle of more than 50%. With a shorted transistor the duty cycle becomes less than 50%.

Circuits constructed in accordance with this invention use a linear-responding power stage which do not require pulse width modulated input signals. Current programming is used to eliminate the exciter time constant, and a half-bridge output stage configuration maximizes forcing of the field current. The fault-tolerant design provides controlled dv/dt at the output and inherent exciter field current-limiting. Reduced modulation can be achieved by synchronizing the clock signal to the AC output of the generator.

Although the present invention has been described in terms of what is at present believed to be its preferred embodiment, it will be apparent to those skilled in the art that various changes may be made without departing from the scope of the invention. It is therefore intended that the appended claims cover such changes.

What is claimed is:

1. A generator voltage regulator power circuit comprising:
    switching means for connecting or disconnecting a generator exciter field winding to a DC power source;
    discharge means for conducting current, produced by a collapsing magnetic field in said exciter field winding following disconnection of said exciter field winding by said switching means, in a reverse direction through said DC power source; and
    means for driving said switching means with a series of turn-on pulses, each of said turn-on pulses being initiated in response to an initial transition from a first logic level to a second logic level in a clock signal and being terminated when current in said exciter field winding reaches a predetermined magnitude or when the next transition from said first logic level to said second logic level occurs in said clock signal.

2. A method of providing field current to an exciter winding of an electric generator, said method comprising the steps of:
    connecting or disconnecting a generator exciter field winding to a DC power source by switching means;
    conducting current, produced by a collapsing magnetic field in said exciter field winding following disconnection of said exciter field winding by said switching means, in a reverse direction through said DC power source by a discharge means; and
    driving said switching means with a series of turn-on pulses, each of said turn-on pulses being initiated in response to an initial transition from a first logic level to a second logic level in a clock signal and being terminated when current in said exciter field winding reaches a predetermined magnitude or when the next transition from said first logic level to said second logic level occurs in said clock signal.

3. A generator voltage regulator power circuit comprising:
    a first solid state switching device electrically connected between a first end of an exciter field winding of an electric generator and a first DC power source conductor;
    a second solid state switching device electrically connected between a second end of said exciter field winding and a second DC power source conductor;
    a first diode electrically connected between said first end of said exciter field winding and said second DC power source conductor;
    a second diode electrically connected between said second end of said exciter field winding and said first DC power source conductor; and
    means for substantially simultaneously supplying a series of turn-on pulses to said first and second solid state switching devices, each of said turn-on pulses being initiated in response to an initial transition from a first logic level to a second logic level in a clock signal and being terminated when current in said exciter field winding reaches a predetermined magnitude or when the next transition from said first logic level to said second logic level occurs in said clock signal.

4. A generator voltage regulator as recited in claim 3, wherein said means for supplying turn-on pulses comprises:
    means for producing a current indicating signal, representative of actual current flowing in said exciter field winding;
    means for comparing said current indicating signal with a current demand signal, representative of a desired exciter field current, and for producing a control signal when the magnitude of said current indicating signal exceeds a threshold magnitude corresponding to said current demand signal;
    means for producing said series of turn-on pulses, each of said pulses being initiated a predetermined time following said initial one of said transitions from said first logic level to said second logic level in said clock signal and being terminated in response to said control signal or to said next transition from said first logic level to said second logic level in said clock signal; and
    means for driving said first and second solid state switching devices in response to said turn-on pulses.

5. A method of providing field current to an exciter field winding of an electric generator, said method comprising the steps of:

connecting a first solid state switching device electrically between a first end of an exciter field winding of an electric generator and a first DC power source conductor;

connecting a second solid state switching device electrically between a second end of said exciter field winding and a second DC power source conductor;

connecting a first diode electrically between said first end of said exciter field winding and said second DC power source conductor;

connecting a second diode electrically between said second end of said exciter field winding and said first DC power source conductor; and substantially simultaneously supplying a series of turn-on pulses to said first and second solid state switching devices, each of said turn-on pulses being initiated in response to an initial transition from a first logic level to a second logic level in a clock signal and being terminated when current in said exciter field winding reaches a predetermined magnitude or when the next transition from said first logic level to said second logic level occurs in said clock signal.

6. A method of providing field current to an exciter winding of an electric generator as recited in claim 5, wherein the step of supplying a series of turn-on pulses comprises the steps of:

producing a current indicating signal, representative of actual current flowing said exciter field winding;

comparing said current indicating signal with a current demand signal, representative of a desired exciter field current;

producing a control signal when the magnitude of said current indicating signal exceeds a threshold magnitude corresponding to said current demand signal;

producing said series of turn-on pulses, each of said pulses being initiated a predetermined time following said initial one of said transitions from said first logic level to said second logic level in said clock signal and being terminated in response to said control signal or to said next transition from said first logic level to said second logic level in said clock signal; and driving said first and second solid state switching devices in response to said turn-on pulses.

* * * * *